US009315254B2

(12) United States Patent
Walker et al.

(10) Patent No.: US 9,315,254 B2
(45) Date of Patent: Apr. 19, 2016

(54) JOINT ASSEMBLY AND METHOD OF ASSEMBLING SAME

(71) Applicant: The Boeing Company, Seal Beach, CA (US)

(72) Inventors: Steven Paul Walker, Arlington, WA (US); Joanna Mara Sergiane Veit, Everett, WA (US); Isaac G. Cambronero, Jr., Millcreek, WA (US); James Donald Davis, Kirkland, WA (US); Michael D. Pagliarini, Seattle, WA (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 14/051,926

(22) Filed: Oct. 11, 2013

(65) Prior Publication Data

US 2015/0102169 A1    Apr. 16, 2015

(51) Int. Cl.
*B64C 1/26*    (2006.01)

(52) U.S. Cl.
CPC ............. *B64C 1/26* (2013.01); *Y10T 29/49622* (2015.01)

(58) Field of Classification Search
CPC .......... B64C 1/26; B64C 1/069; B64C 1/068; B64C 1/061
See application file for complete search history.

(56) References Cited

U.S. PATENT DOCUMENTS

| 7,837,148 B2 | 11/2010 | Kismarton et al. |
| 8,016,236 B2 | 9/2011 | Grieve et al. |
| 8,348,196 B2 * | 1/2013 | Campana ................... 244/123.1 |
| 8,371,532 B2 * | 2/2013 | Williams .................. B64C 1/26 |
| | | 244/123.7 |
| 8,684,311 B2 * | 4/2014 | Nordman et al. ............. 244/131 |
| 8,720,823 B2 * | 5/2014 | Lafly et al. ................. 244/123.1 |
| 2008/0283666 A1 | 11/2008 | Grieve et al. |
| 2011/0089292 A1 | 4/2011 | Williams et al. |
| 2011/0147521 A1 * | 6/2011 | Delahaye et al. ............. 244/119 |

OTHER PUBLICATIONS

Extended European Search Report for Application No. 14184452.2, Apr. 28, 2015, 6 pages.
Office Action for Canadian Patent Application No. 2856845, Jul. 9, 2015, 4 pages.

* cited by examiner

*Primary Examiner* — Tien Dinh
*Assistant Examiner* — Richard R Green
(74) *Attorney, Agent, or Firm* — Armstrong Teasdale LLP (57) ABSTRACT

A joint assembly for an aircraft is provided. The joint assembly includes a single main fitting including a first flange, a second flange, and a third flange, an external spar component coupled to the first flange using at least one fastener, an internal spar component coupled to the second flange using at least one fastener, and a body rib coupled to the third flange using at least one fastener.

18 Claims, 8 Drawing Sheets

JOINT ASSEMBLY AND METHOD OF ASSEMBLING SAME

BACKGROUND

The field of the disclosure relates generally to aircraft assemblies, and, more particularly, to a joint assembly for use in coupling a wing to an aircraft body.

An aircraft generally includes at least two wings coupled to a fuselage. Each wing includes a spar that couples to an associated body rib extending along the fuselage. More specifically, in at least some known aircraft, a joint assembly couples the spar to the associated body rib. The joint assembly may also be used to couple other components of the aircraft, such as the landing gear, to the fuselage.

Figure 1:
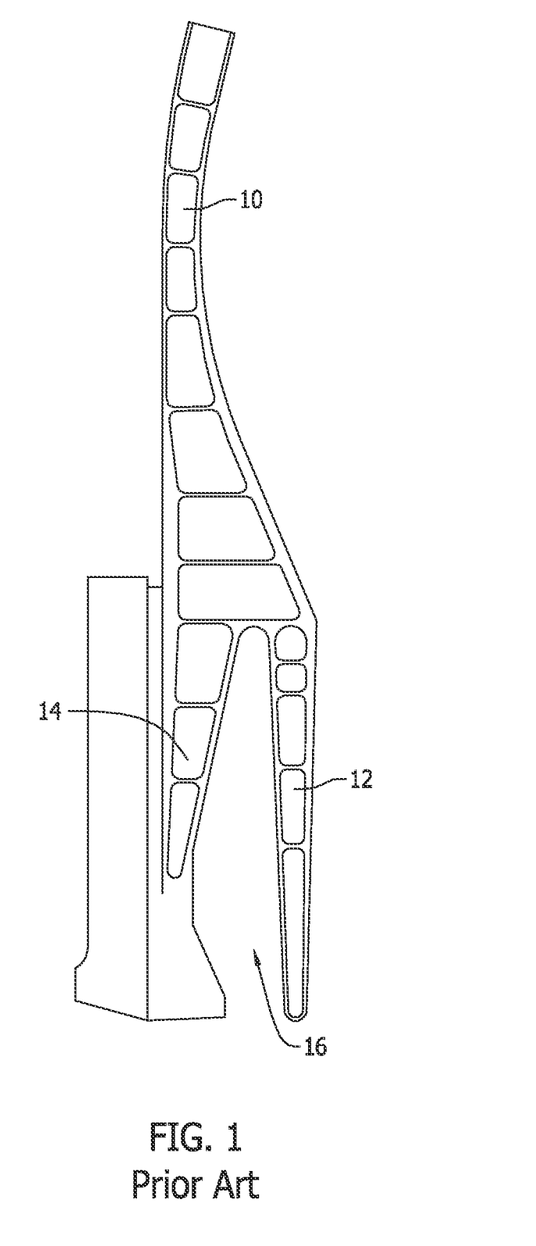
FIG. 1 is a perspective view of a known rear spar bulkhead fitting component.

At least some known joint assemblies are relatively complex assemblies that include a number of different components that are interconnected using fasteners. Because of the number of components and fasteners, such joint assemblies may be relatively expensive to manufacture, relatively time-consuming and difficult to assembly, and are relatively heavy. Further, at least some known joint assemblies include a rear spar bulkhead fitting component that includes two prongs separated by a relatively large gap. For example, FIG. 1 is a schematic view of a known rear spar bulkhead fitting component 10 that includes a first prong 12 and a second prong 14. First and second prongs 12 and 14 are separated by a gap 16. Accordingly, when loads are applied to rear spar bulkhead fitting component 10, a moment, or torque, may be induced by opposing forces in first and second prongs 12 and 14.

BRIEF DESCRIPTION

In one aspect, a joint assembly for an aircraft is provided. The joint assembly includes a single main fitting including a first flange, a second flange, and a third flange, an external spar component coupled to the first flange using at least one fastener, an internal spar component coupled to the second flange using at least one fastener, and a body rib coupled to the third flange using at least one fastener.

In another aspect, a joint for an aircraft is provided. The joint includes a single main fitting that includes a first flange configured to couple the main fitting to an external spar component of the aircraft, a second flange configured to couple the main fitting to an internal spar component of the aircraft, and a third flange configured to couple the main fitting to a body rib of the aircraft.

In yet another aspect, a method of assembling a joint assembly of an aircraft is provided. The method includes coupling an external spar component of the aircraft to a first flange of a single main fitting using at least one fastener, coupling an internal spar component of the aircraft to a second flange of the main fitting using at least one fastener, and coupling a body rib of the aircraft to a third flange of the main fitting using at least one fastener.

DETAILED DESCRIPTION

The systems and methods described herein provide a joint assembly for an aircraft that includes a single main fitting. The main fitting includes a first flange, a second flange, and a third flange. Using a plurality of fasteners, the first flange couples to an external spar component, the second flange couples to an internal spar component, and the third flange couples to a body rib. When loads are applied to the joint assembly, the main fitting provides a substantially vertical load path, and prevents generation of a moment, or torque, in the joint assembly.

Figure 2:
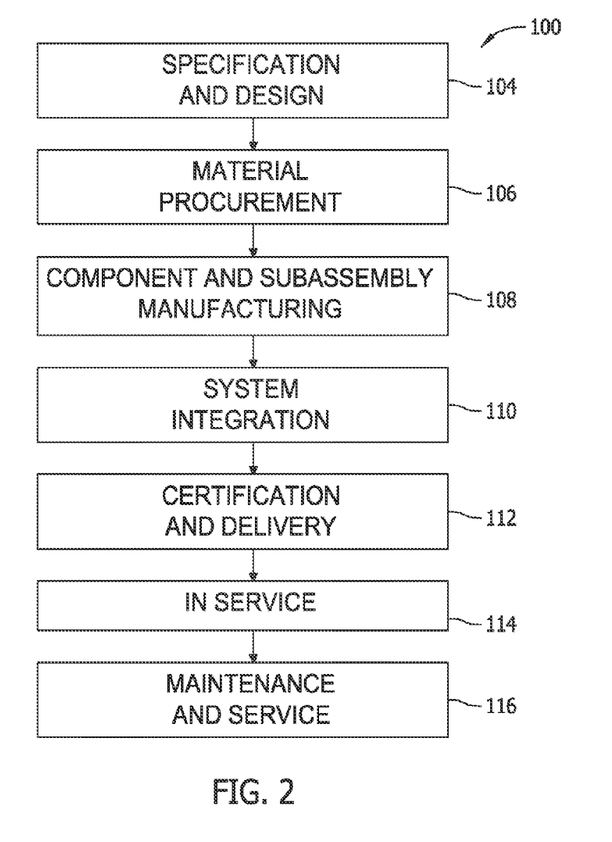
FIG. 2 is a flow diagram of an exemplary aircraft production and service methodology.
Figure 3:
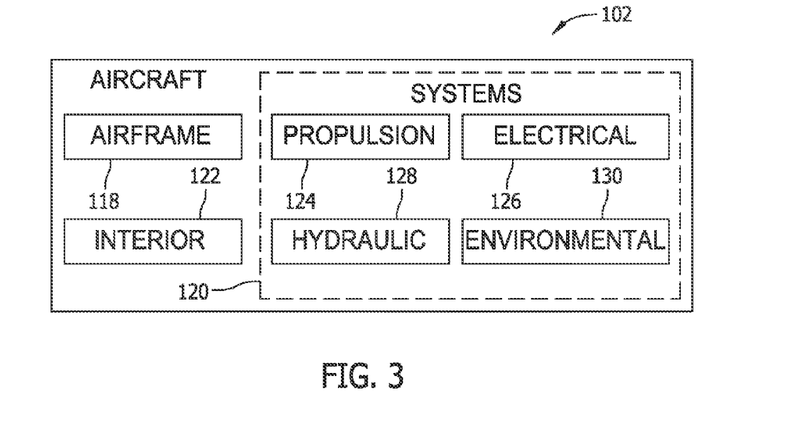
FIG. 3 is a block diagram of an aircraft.

Referring more particularly to the drawings, implementations of the disclosure may be described in the context of an aircraft manufacturing and service method 100 as shown in FIG. 2 and an aircraft 102 as shown in FIG. 3. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 3, the aircraft 102 produced by exemplary method 100 may include an airframe 118 with a plurality of systems 120 and an interior 122. Examples of high-level systems 120 include one or more of a propulsion system 124, an electrical system 126, a hydraulic system 128, and an environmental system 130. Any number of other systems may be included. Although an aerospace example is shown, the principles of the invention may be applied to other industries, such as the automotive industry.

Apparatuses and methods implemented herein may be employed during any one or more of the stages of the production and service method 100. For example, components or subassemblies corresponding to production process 108 may be fabricated or manufactured in a manner similar to components or subassemblies produced while the aircraft 102 is in service. Also, one or more apparatus implementations, method implementations, or a combination thereof may be utilized during the production stages 108 and 110, for example, by substantially expediting assembly of or reducing the cost of an aircraft 102. Similarly, one or more of apparatus implementations, method implementations, or a combination thereof may be utilized while the aircraft 102 is in service, for example and without limitation, to maintenance and service 116.

Figure 4:
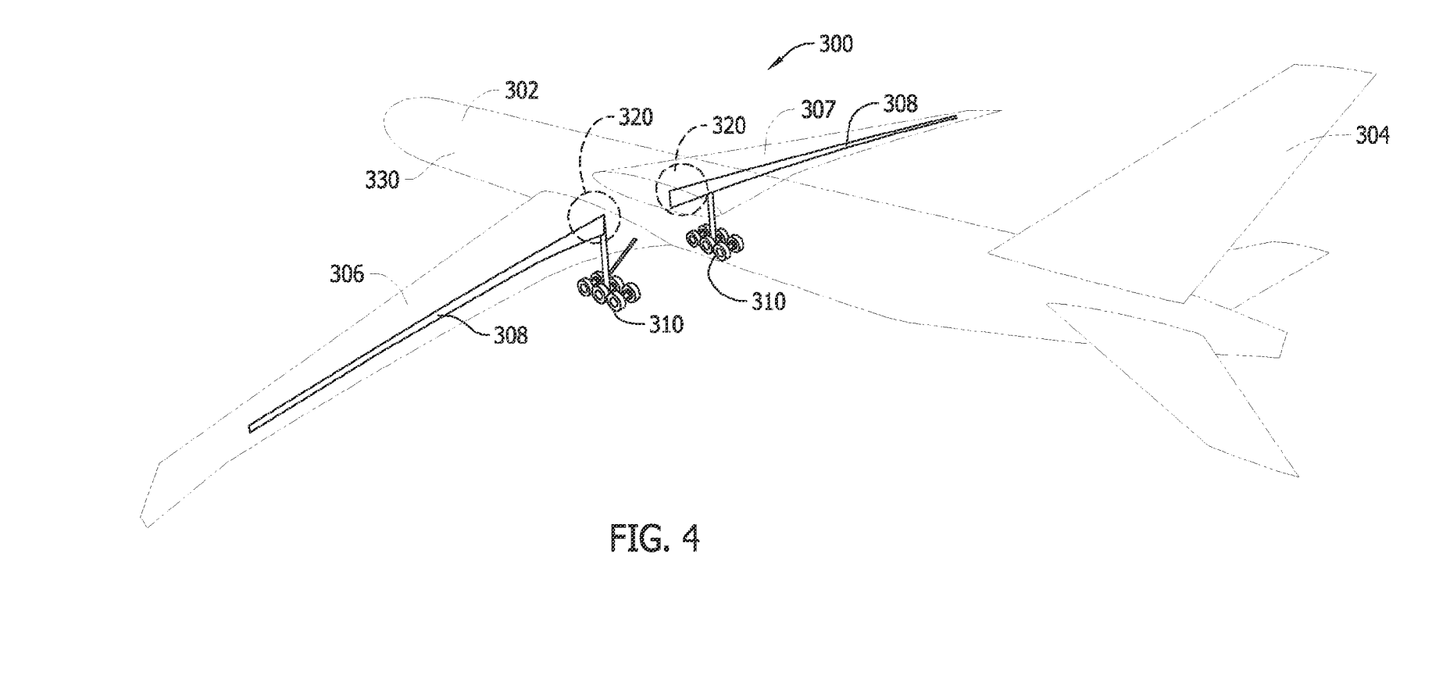
FIG. 4 is a perspective view of an exemplary aircraft.

FIG. 4 is a perspective view of an exemplary aircraft 300, such as aircraft 102 (shown in FIG. 3). In the exemplary implementation, aircraft 300 includes a fuselage 302, a tail assembly 304, a left wing assembly 306, and a right wing assembly 307. Each wing assembly 306 and 307 includes a rear spar 308 and a landing gear assembly 310. Body ribs (not shown in FIG. 4) run along a length of fuselage 302. At joint areas 320, each body rib is coupled to an associated rear spar 308 using a joint assembly (not shown in FIG. 4). A skin 330 extends over an exterior of aircraft 300.

Figure 5:
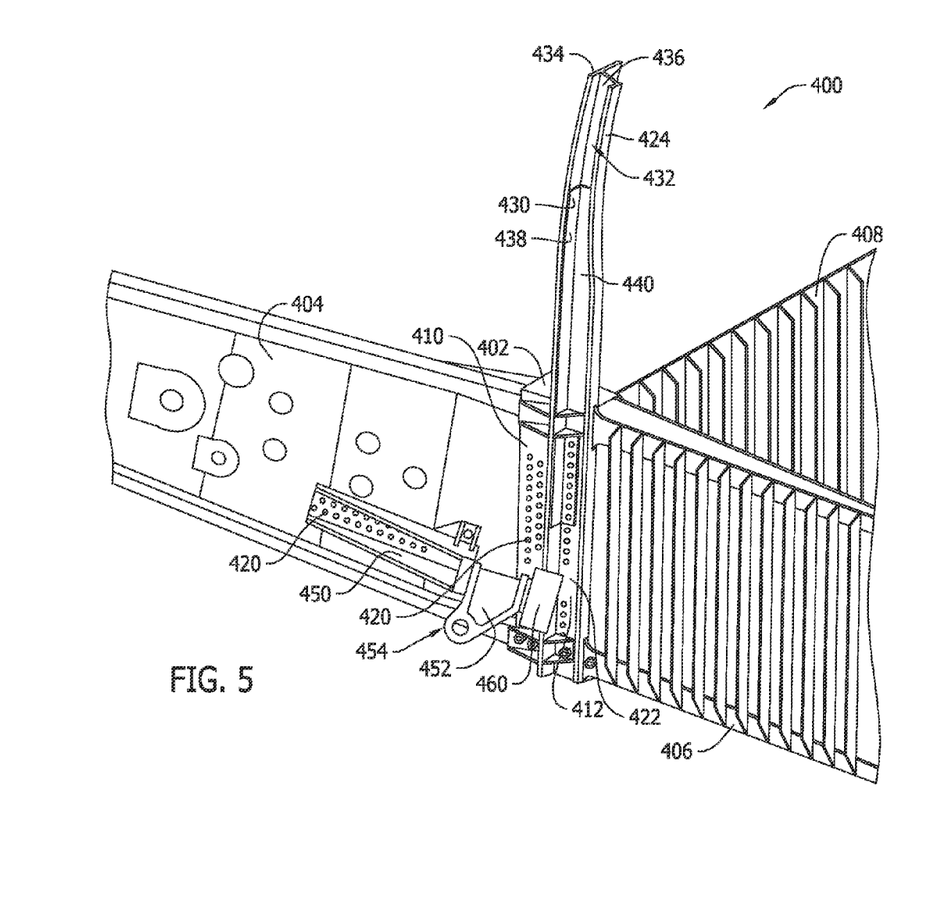
FIG. 5 is a perspective view of an exemplary joint assembly that may be used with aircraft shown in FIG. 4.
Figure 6:
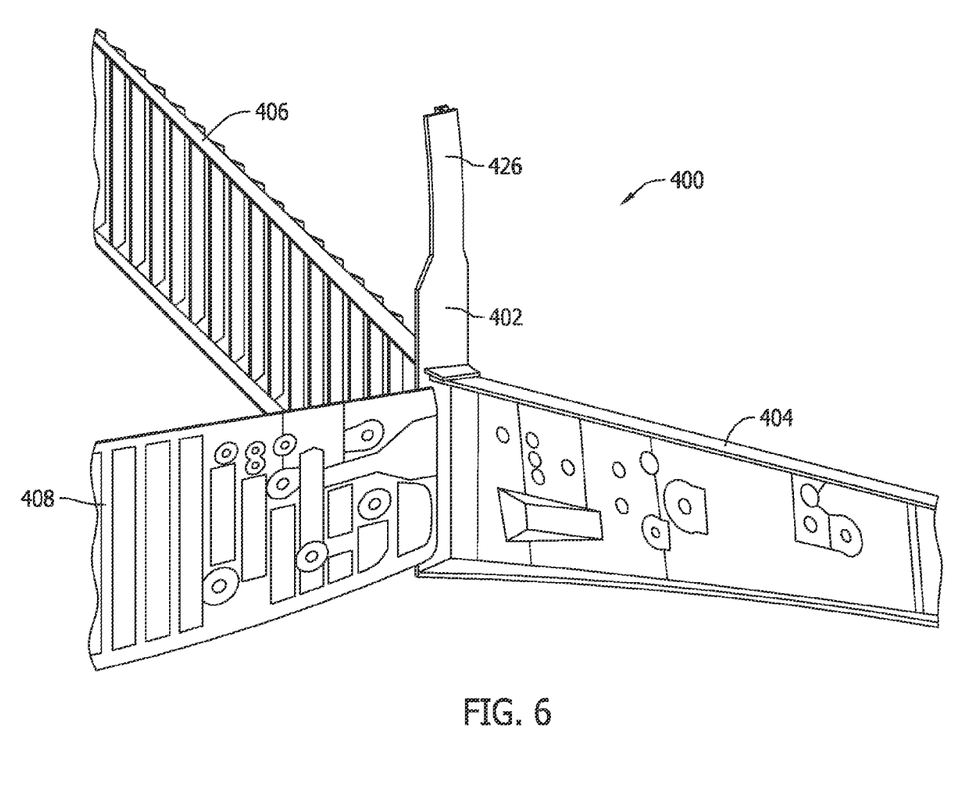
FIG. 6 is a perspective view of the joint assembly shown in FIG. 5.
Figure 7:
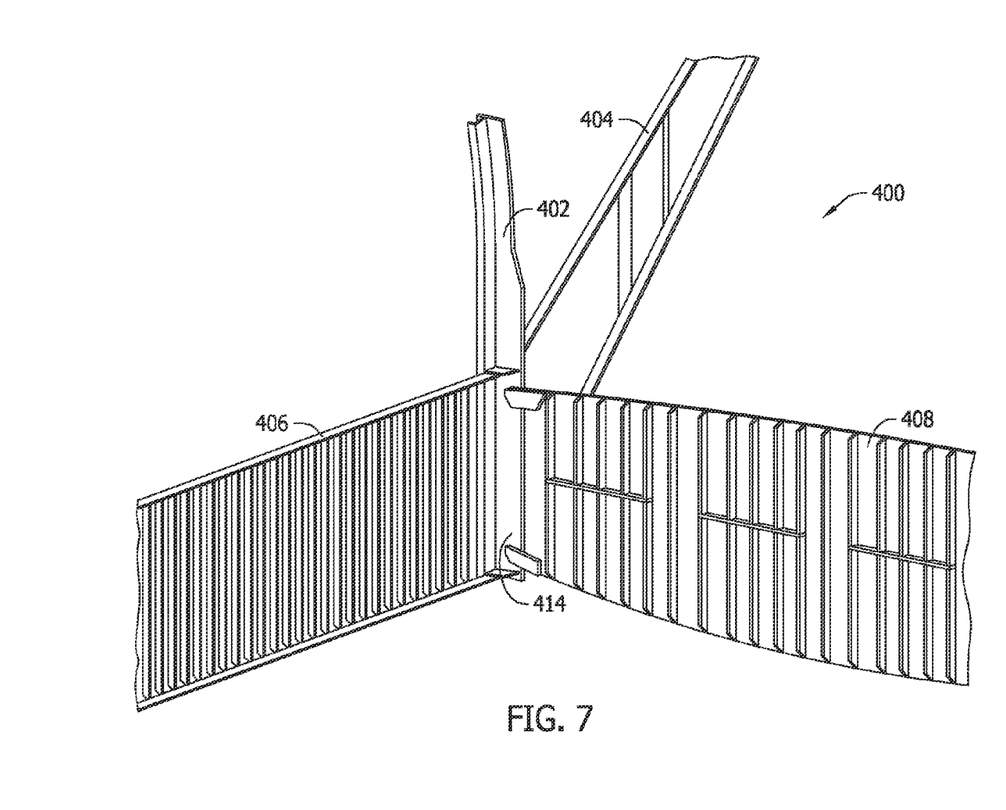
FIG. 7 is a perspective view of the joint assembly shown in FIG. 5.

FIG. 5 is a perspective view of an exemplary joint assembly 400 that may be used with aircraft 300 (shown in FIG. 4). FIG. 6 is a perspective view of joint assembly 400. FIG. 7 is a perspective view of joint assembly 400. As shown in FIGS. 5-7, joint assembly 400 includes a single main fitting 402 that couples an external spar component 404, an internal spar component 406, and a body rib 408 to each other.

External spar component 404 and internal spar component 406 form rear spar 308 (shown in FIG. 4). Specifically, external spar component 404 extends through an associated wing assembly 306 or 308 (shown in FIG. 4), and internal spar component 406 extends through fuselage 302 (shown in FIG. 4).

Main fitting 402 includes a first flange 410, a second flange 412, and a third flange 414. External spar component 404 is coupled to main fitting 402 at first flange 410 using a plurality of fasteners 420 (e.g., rivets, bolts, etc.). Similarly, internal spar component 406 is coupled to main fitting 402 at second flange 412 using fasteners 420, and body rib 408 is coupled to main fitting 402 at third flange 414 using fasteners 420.

First and second flanges 410 and 412 are oriented at an angle to one another. Accordingly, external and internal spar components 404 and 406 are oriented at an angle to one another such that external spar component 404 is swept back relative to fuselage 302 (shown in FIG. 4). Third flange 414 is oriented substantially orthogonal to second flange 412. As such, body rib 408 is oriented substantially orthogonal to internal spar component 406.

In the exemplary implementation, main fitting 402 includes a base portion 422 and an upper portion 424. Flanges 410, 412, and 414 are formed on base portion 422. Upper portion 424 extends upwards from base portion 422 and includes an arcuate surface 426. Skin 330 (shown in FIG. 4) couples to and extends over arcuate surface 426.

Joint assembly 400 includes a failsafe strap 430 in the exemplary implementation. Failsafe strap 430 couples against main fitting 402, as shown in FIG. 5. Specifically, when coupled to main fitting 402, failsafe strap 430 fits into a crevice 432 formed in main fitting 402. Crevice 432 is defined by a first surface 434 of main fitting 402 and a second surface 436 of main fitting 402.

Failsafe strap 430 includes a first plate 438 and a second plate 440. When failsafe strap 430 is coupled to main fitting 402, first plate 438 contacts first surface 434 and second plate 440 contacts second surface 436. Further, failsafe strap 430 extends over at least a portion of base portion 422 and upper portion 424. In the event of a failure of main fitting 402 (e.g., cracking of main fitting 402 due to excess loads), load paths are transferred through failsafe strap 430. Accordingly, failsafe strap 430 serves as backup for main fitting 402 in the event main fitting 402 should fail.

In the exemplary implementation, joint assembly 400 includes a side fitting 450 coupled to external spar component 404 by fasteners 420. An intermediate fitting 452 is coupled between side fitting 450 and main fitting 402. Intermediate fitting 452 includes an aperture 454 to facilitate coupling joint assembly 400 to at least one component of landing gear assembly 310 (shown in FIG. 4). Side fitting 450 and intermediate fitting 452 function as a drag brace fitting in joint assembly 400. The drag brace fitting is the link between fuselage 302 (shown in FIG. 4) and landing gear assembly 310. When brakes of aircraft 300 (shown in FIG. 4) are applied, the drag brace fitting transmits aft-acting forces from the brakes to fuselage 302.

Main fitting 402, failsafe strap 430, side fitting 450, and intermediate fitting 452 form a single joint 460 that couples external spar component 404, internal spar component 406, and body rib 408 to each other.

During aircraft operations, various loads are applied to joint assembly 400. For example, substantial loads may be applied to joint assembly 400 during take-off and/or landing maneuvers. At least some known joint assemblies include a rear spar bulkhead fitting component that includes two prongs separated by a relatively large gap. When loads are applied to such joint assemblies, the configuration of the rear spar bulkhead fitting component may cause an undesirable moment, or torque, to be generated. Notably, unlike at least some known rear spar bulkhead fitting components, main fitting 402 is substantially solid, and does not include any gaps. Accordingly, unlike at least some known joint assemblies, when loads are applied to main fitting 402, a load path through main fitting 402 is substantially vertical (i.e., the load path extends in a direction from base portion 422 to upper portion 424), and no significant moment, or torque, is generated. Further, as joint assembly 400 includes a single main fitting 402, the number of fasteners in joint assembly 400, the number of separate components in joint assembly 400, the cost to manufacture joint assembly, and the weight of joint assembly 400 may all be significantly less as compared to at least some known joint assemblies.

Figure 8:
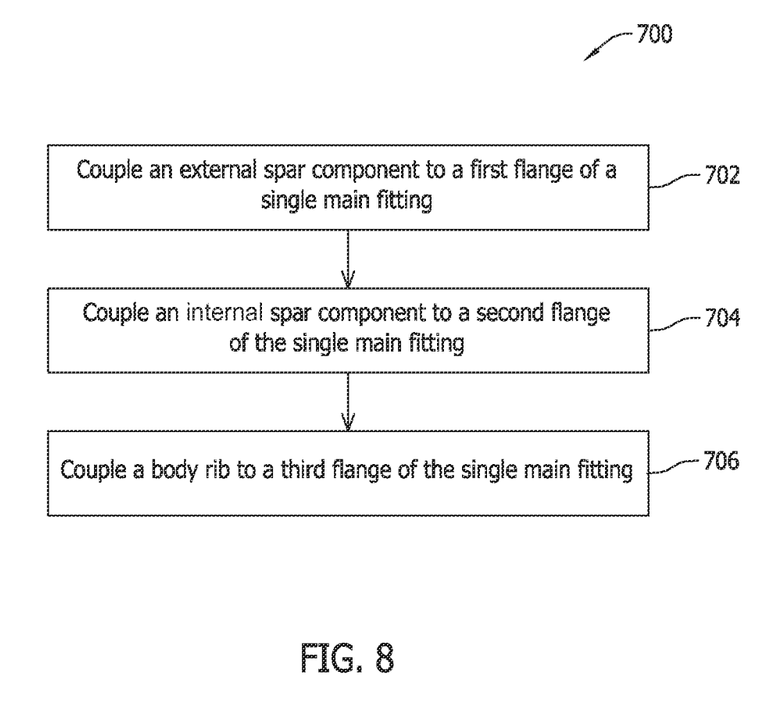
FIG. 8 is a flowchart of an exemplary method that may be used to assemble the joint assembly shown in FIG. 5.

FIG. 8 is a flowchart of an exemplary method 700 that may be used to assemble a joint assembly, such as joint assembly 400 (shown in FIGS. 5-7). Method 700 includes coupling 702 an external spar component, such as external spar component 404 (shown in FIG. 5), to a first flange of a single main fitting, such as first flange 410 of main fitting 402 (shown in FIG. 5). An internal spar component, such as internal spar component 406 (shown in FIG. 5), is coupled 704 to a second flange of the main fitting, such as second flange 412 (shown in FIG. 5). A body rib, such as body rib 408 (shown in FIG. 5), is coupled 706 to a third flange of the main fitting, such as third flange 414 (shown in FIG. 5). The main fitting provides a relatively simple attachment configuration between the external spar component, the internal spar component, and the body rib. Further, when loads are applied to the main fitting, a substantially vertical load path is generated.

Figure 9:
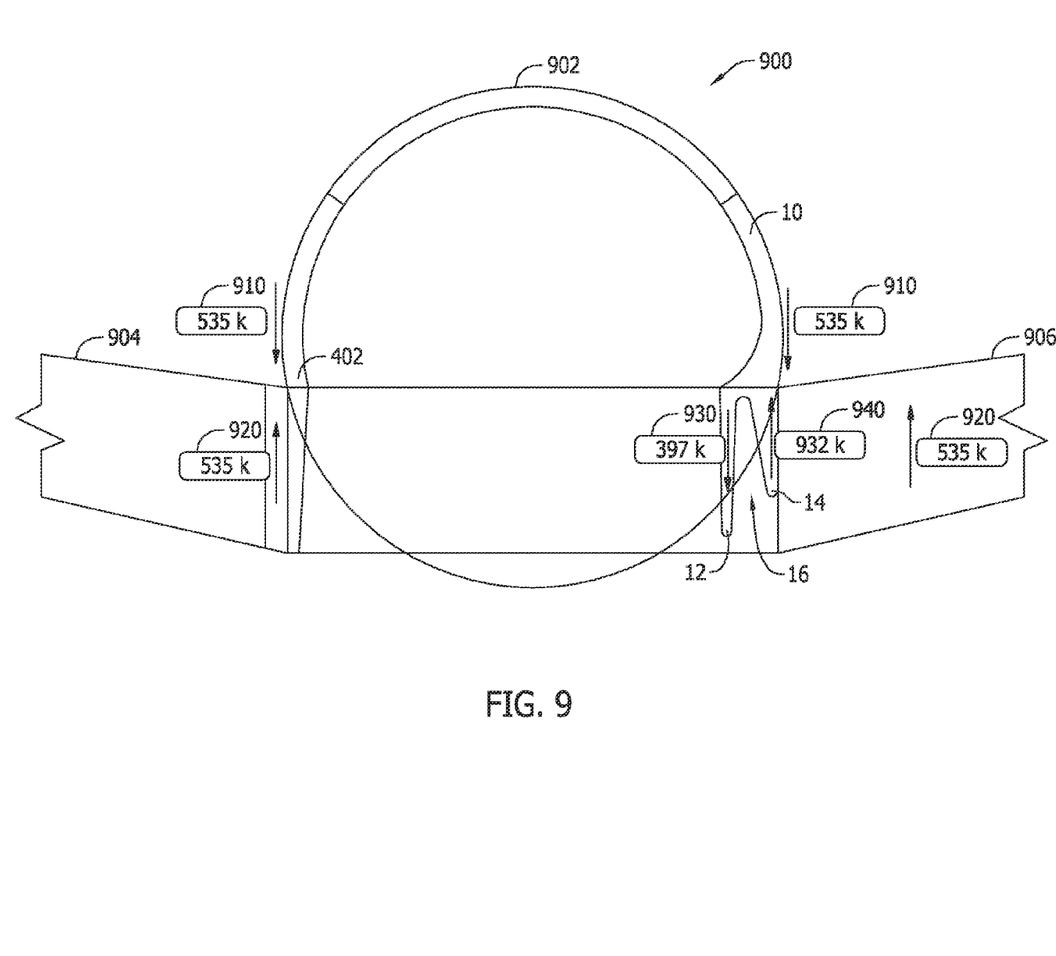
FIG. 9 is a load diagram comparing the main fitting of the joint assembly shown in FIG. 5 to the known rear spar bulkhead fitting component shown in FIG. 1.

FIG. 9 is a load diagram 900 comparing main fitting 402 (shown in FIG. 5) and known rear spar bulkhead fitting component 10 (shown in FIG. 1). Load diagram 900 includes a fuselage 902, a first wing assembly 904, and a second wing assembly 906. For comparison purposes, main fitting 402 couples first wing assembly 904 to fuselage 902, and known rear spar bulkhead fitting component 10 couples second wing assembly 906 to fuselage. Loads shown in FIG. 9 may be applied, for example, during take-off and/or landing maneuvers.

As shown in FIG. 9, applying loads to main fitting 402 results in a substantially vertical load path, with a first load 910 and a second opposing load 920 substantially aligned. Accordingly, main fitting 402 is configured to prevent generation of a moment, or torque, when loads are applied. In contrast, applying loads to rear spar bulkhead fitting component 10 generates a moment, or torque. Specifically, a downward supplementary load 930 is generated in first prong 12, and an upward supplementary load 940 is generated in second prong 14. The opposing supplementary loads 930 and 940 are not aligned, but are separated by gap 16, resulting in generation of a moment, or torque. Accordingly, main fitting 402, unlike rear spar bulkhead fitting component 10, is configured to facilitate preventing generation of a moment, or torque.

The implementations described herein provide a joint assembly for an aircraft that includes a single main fitting. The main fitting includes a first flange, a second flange, and a third flange. Using a plurality of fasteners, the first flange couples to an external spar component, the second flange couples to an internal spar component, and the third flange couples to a body rib. When loads are applied to the joint assembly, the main fitting provides a substantially vertical load path, and prevents generation of a moment, or torque, in the joint assembly.

The implementations described herein provide improvements over at least some joint assemblies. As compared to at least some joint assemblies, the joint assemblies described herein include a single main fitting instead of a plurality of interconnected components. Accordingly, as compared to at least some joint assemblies, the joint assemblies described herein may be less expensive and time-consuming to manufacture, weigh less, and require fewer fasteners. Further, unlike at least some known joint assemblies, the joint assemblies described herein do not include a rear spar bulkhead fitting component that includes two prongs separated by a relatively large gap. As such, the joint assemblies described herein provide a substantially vertical load path and prevent generation of a moment, or torque, when loads are applied.

This written description uses examples to disclose various implementations, which include the best mode, to enable any person skilled in the art to practice those implementations, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A joint assembly for an aircraft, said joint assembly comprising:
    a single main fitting comprising a first flange, a second flange, and a third flange, wherein said main fitting is elongate in a substantially vertical direction when positioned in the aircraft with a landing gear assembly contacting a substantially horizontal ground surface;
    an external spar component coupled to said first flange;
    an internal spar component coupled to said second flange;
    a body rib coupled to said third flange, said body rib extending away from said third flange towards a front of the aircraft; and
    an intermediate fitting configured to directly couple said main fitting to the landing gear assembly.

2. A joint assembly in accordance with claim 1, further comprising:
    a side fitting coupled to said external spar component; and
    said intermediate fitting coupled between said side fitting and said main fitting.

3. A joint assembly in accordance with claim 1, wherein said second flange is substantially orthogonal to said third flange.

4. A joint assembly in accordance with claim 1, wherein said main fitting comprises an upper portion and a base portion, and wherein said first, second, and third flanges are formed on said base portion.

5. A joint assembly in accordance with claim 4, wherein said upper portion comprises an arcuate surface configured to couple to a skin of the aircraft.

6. A joint assembly in accordance with claim 1, wherein said main fitting is configured to provide a substantially vertical load path when loads are applied to said joint assembly.

7. A joint assembly in accordance with claim 1, wherein said first, second, and third flanges are elongate in the substantially vertical direction.

8. A joint for an aircraft, said joint comprising a single main fitting that comprises:
    a first flange configured to couple said main fitting to an external spar component of the aircraft;
    a second flange configured to couple said main fitting to an internal spar component of the aircraft;
    a third flange configured to couple said main fitting to a body rib of the aircraft such that the body rib extends away from said third flange towards a front of the aircraft, wherein said main fitting is elongate in a substantially vertical direction when positioned in the aircraft with a landing gear assembly contacting a substantially horizontal ground surface; and
    an intermediate fitting configured to directly couple said main fitting to the landing gear assembly.

9. A joint in accordance with claim 8, further comprising:
    a side fitting configured to couple to the external spar component; and
    said intermediate fitting coupled between said side fitting and said main fitting.

10. A joint in accordance with claim 8, wherein said second flange is substantially orthogonal to said third flange.

11. A joint in accordance with claim 8, wherein said main fitting comprises an upper portion and a base portion, and wherein said first, second, and third flanges are formed on said base portion.

12. A joint in accordance with claim 11, wherein said upper portion comprises an arcuate surface configured to couple to a skin of the aircraft.

13. A joint in accordance with claim 8, wherein said main fitting is configured to provide a substantially vertical load path when loads are applied to said joint.

14. A method of assembling a joint assembly of an aircraft, said method comprising:
    coupling an external spar component of the aircraft to a first flange of a single main fitting;
    coupling an internal spar component of the aircraft to a second flange of the main fitting;
    coupling a body rib of the aircraft to a third flange of the main fitting such that the body rib extends away from the third flange towards a front of the aircraft, wherein said main fitting is elongate in a substantially vertical direction when positioned in the aircraft with a landing gear assembly contacting a substantially horizontal ground surface; and
    directly coupling the main fitting to a landing gear assembly of the aircraft using an intermediate fitting.

15. A method in accordance with claim 14, further comprising:
    coupling a side fitting to the external spar component; and coupling the intermediate fitting between the side fitting and the main fitting.

16. A method in accordance with claim 14, wherein coupling a body rib comprises coupling the body rib to the third flange such that the body rib is oriented substantially orthogonal to the internal spar component.

17. A method in accordance with claim 14, wherein the main fitting includes an upper portion and a base portion, said method further comprising forming the first, second, and third flanges on the base portion of the main fitting.

18. A method in accordance with claim 17, further comprising coupling a skin of the aircraft to an arcuate surface on the upper portion of the main fitting.

\* \* \* \* \*